Oct. 12, 1943.     G. G. MERCHEN     2,331,710
SCALE CONTROLLED, RECORDING AND INDICATING MACHINE
Filed March 24, 1941     3 Sheets-Sheet 1
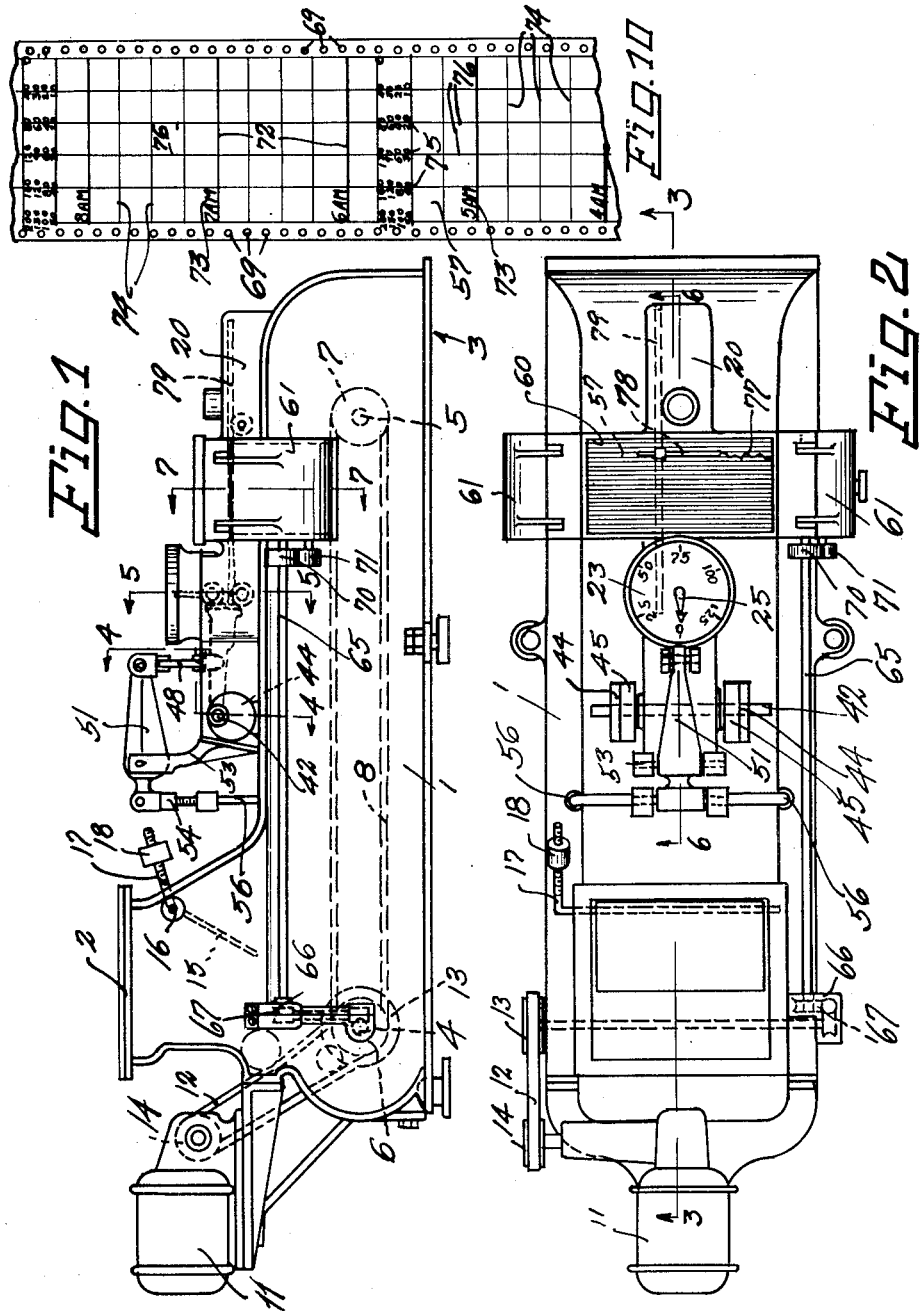
Inventor
Glen G. Merchen
By
Glenn L. Fish
Attorney

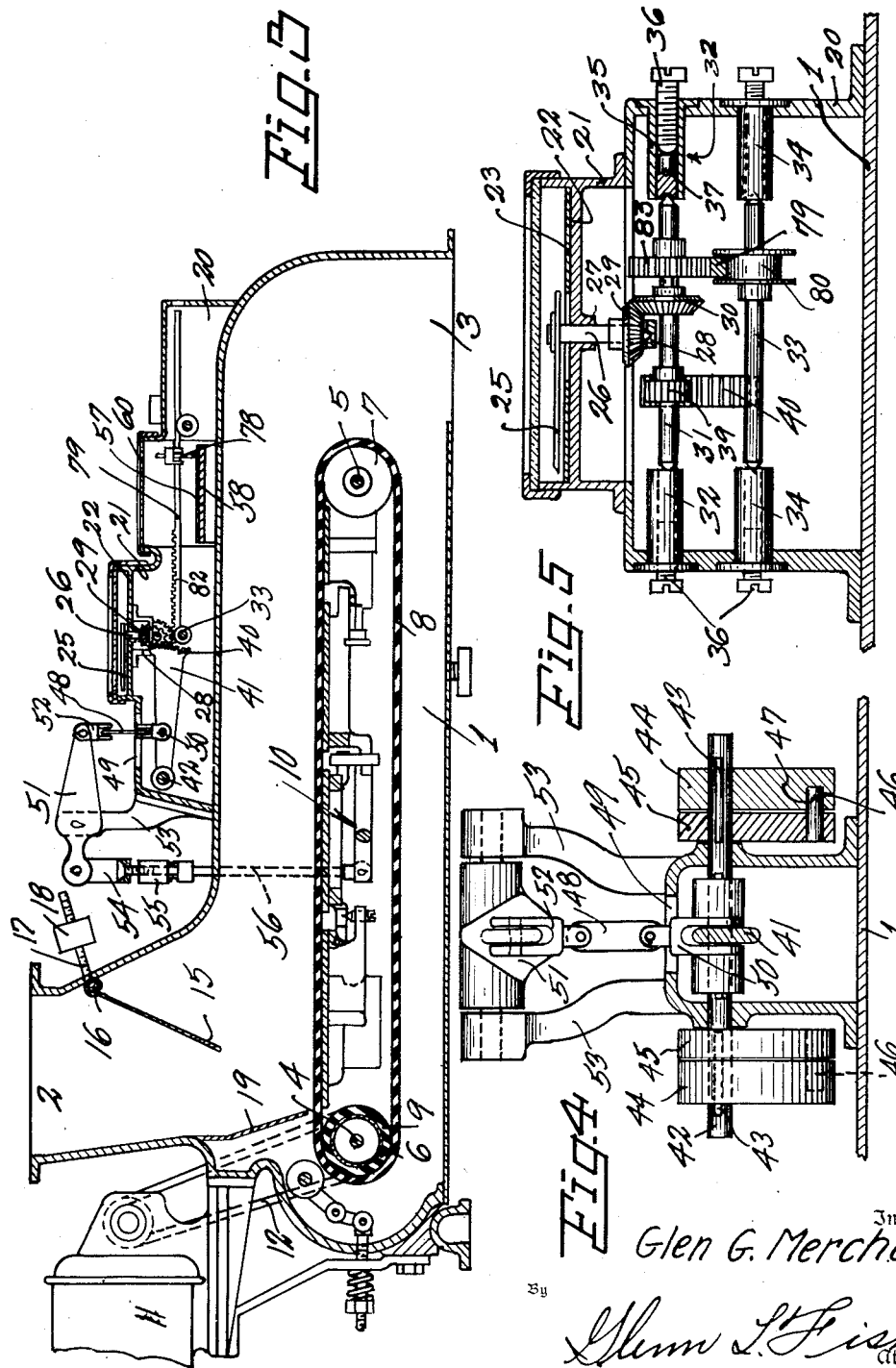

Oct. 12, 1943.　　G. G. MERCHEN　　2,331,710
SCALE CONTROLLED, RECORDING AND INDICATING MACHINE
Filed March 24, 1941　　3 Sheets-Sheet 3
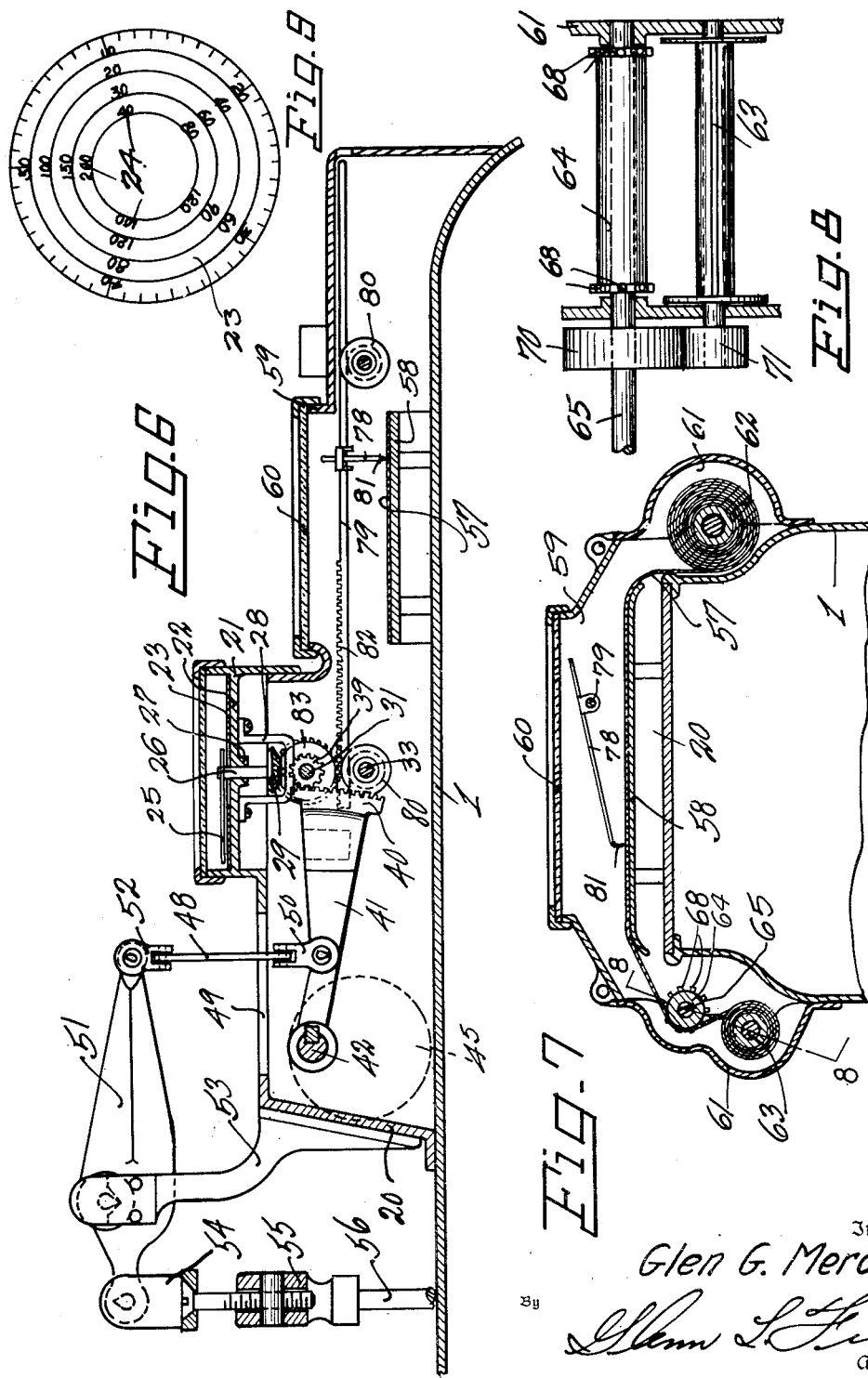
Inventor
Glen G. Merchen
By
Glenn L. Fish
Attorney Patented Oct. 12, 1943

2,331,710

UNITED STATES PATENT OFFICE 2,331,710

SCALE-CONTROLLED RECORDING AND INDICATING MACHINE

Glen G. Merchen, Yardley, Wash.

Application March 24, 1941, Serial No. 384,902

5 Claims. (Cl. 265—5)

This invention relates to a scale for weighing a continuously moving stream of grain, flour, or other material of such nature that it may flow through a pipe or other conduit in which the scale is installed, it being one object of the invention to provide such a scale with means for indicating the weight of a quantity of material passing over a scale platform and companion means for recording by weight, the quantity of material which has passed through the scale during a certain period of time.

Another object of the invention is to provide the machine with a specially constructed dial mounted over the machine in such position that it may be easily seen and so connected with the beam of the scale that the weight of material passing over the scale platform will be accurately indicated on the dial.

Another object of the invention is to provide a recording mechanism disposed over the machine in position to be easily seen and including a ribbon moving longitudinally at a predetermined speed and having its upper face provided with scale markings along which a marker forms a line as the ribbon moves longitudinally.

A further object of the invention is to provide a scale wherein casings for the dial and the ribbon are formed integral with the main scale casing and are so located that they are in close proximity to each other, where they may be both readily observed by a person looking down on the scale.

Another object of the invention is to provide a scale of this character which is simple in construction, very accurate, and not likely to get out of order.

The invention is illustrated in the accompanying drawings, wherein:

Fig. 1 is a side elevation of the improved scale.

Fig. 2 is a top plan view thereof.

Fig. 3 is a sectional view taken longitudinal of the scale.

Fig. 4 is a transverse sectional view on the line 4—4 of Fig. 1.

Fig. 5 is a sectional view on the line 5—5 of Fig. 1.

Fig. 6 is a sectional view on the line 6—6 of Fig. 2.

Fig. 7 is a sectional view on the line 7—7 of Fig. 1.

Fig. 8 is a fragmentary view on the line 8—8 of Fig. 7, showing the driving and receiving spools of the recording strip.

Fig. 9 is a disc dial.

Fig. 10 is a view of a portion of the strip chart.

This scale embodies an elongated housing 1 which is preferably formed as a casting and has an inlet throat 2 at one end and an outlet 3 at its other end. Shafts 4 and 5 are journaled through the casing transversely thereof and carry rollers 6 and 7 about which is trained a conveyer belt 8, the roller 6 constituting a driving roller and being provided with a rubber sleeve 9 so that, as the roller is turned with the drive shaft, slippage between the roller and the belt will be eliminated and continuous movement imparted to the belt so that the upper flight moves longitudinally over the platform of scale mechanism indicated in general by the numeral 10. The scale mechanism is of the same construction shown and described in detail in my copending application for patent filed April 3, 1940, and bearing Serial No. 327,613, and, therefore, is not herein specifically described.

Rotary motion is transmitted to the drive shaft 4 from a motor 11, by a belt 12 trained about pulleys 13 and 14 carried by the shaft 4 and the shaft of the motor. Flow of material into the casing through the throat 2 is controlled by a gate 15 mounted on a shaft 16. This shaft is journaled transversely through the throat and one end portion of the shaft is bent to form a lever arm 17 which is threaded and carries a counterweight 18. By adjusting the weight along the lever, the gate will be counterbalanced in such a manner that it will deflect a stream of light or heavy material flowing through the throat toward a lower baffle plate 19 and cause the material to flow easily onto the conveyor belt and be evenly distributed thereon as the conveyor belt moves longitudinally in the casing 1.

An auxiliary housing 20 is mounted longitudinally over the main housing or casing 1, and this auxiliary housing carries a casing 21 in which is a partition 22 constituting a support for a circular dial 23. The markings on the dial are arranged in radially extending columns, as shown at 24 in Fig. 9, and over this dial operates a pointer 25 carried by a shaft 26 which is rotatably mounted through a bearing 27 at the center of the partition 22. The lower end of the shaft 26 is rotatably supported by a bearing bracket 28 and carries a beveled gear 29 which meshes with a beveled gear 30 fixed to a horizontally extending shaft 31. This shaft 31 extends transversely in the housing 20 with its ends rotatably mounted in bearings 32, and below this shaft is a second shaft 33 which also extends transversely in the housing and has its ends rotatably mounted in bearings 34. The bearings are of duplicate construction and each has a tubular barrel 35 mounted through a side wall of the housing 20 and internally threaded to receive an adjusting screw 36. A block 37 for engagement by the adjacent end of a shaft, occupies the inner end portion of the barrel and the outer end of the block is contacted by the screw 36. By adjusting the screws, the ease with which the shafts turn may be readily controlled.

A gear or pinion 39 is fixed to the upper shaft 31 and this gear meshes with an arcuate rack 40 at the free end of a lever 41 which is keyed to a shaft 42 extending transversely through the housing 20 with its end portions journaled through side walls thereof and projecting from opposite sides of the housing. The protruding end portions of the shaft 42 are provided with keys 43 and carry counterweights 44 and 45 which are shiftable along the shaft into and out of position for pins 46, carried by the weights 45 to engage in sockets 47 formed in the weights 44. By this arrangement, the weights may be selectively applied to the shaft and engaged with each other so that they swing about the shaft as the shaft is turned in its bearings. The weights serve as counterweights during operation of the scale and have a tendency to return the pointer to its initial position. By selecting the proper weights, the scale may be controlled and caused to operate within predetermined weight ranges. Referring to Fig. 6, it will be seen that a link 48 extends vertically through an opening 49 in the top of the casing 20 with its lower end connected to the lever 41 by a shackle 50 and its upper end connected with a scale beam 51 by a shackle 52. This scale beam extends longitudinally of the casing 20 and is pivotally mounted for tilting movement by bearing brackets 53 carried by the inner end of the casing. The outer end of the scale beam is pivoted to a bracket 54 located midway the width of the yoke 55, which is of inverted U-shape and has its arms 56 extending downwardly into the housing 1 and pivotally connected with opposite side portions of the scale mechanism 10. By this arrangement, pivotal movement will be imparted to the scale beam 51 as the scale mechanism is depressed in response to the weight of grain or other material on the upper flight of the conveyer belt 8 and, since the lever 41 tilts in response to movements of the lever, the rack 40 will cause rotary motion to be transmitted to the shaft 26 and the pointer swung about the circular dial and visually indicate the weight of the material passing over the scale platform.

In addition to weighing the material moved through the housing by the belt conveyor, it is necessary to have a record of the quantity of grain which passes through the scale during operation thereof. In order to do so, there has been provided a record strip 57 which extends along the upper surface of a table 58. The table and the record strip extend transversely of the housing 20 under an observation casing 59 provided with a transparent top 60 through which the portion of the record strip passing along the table may be seen. Ends of the casing 59 are provided with doors 61 which are hinged for opening and closing movement in order that spools 62 and 63 may be set in place and removed when necessary. The record strip 57 is initially wound upon the spool 62 and, after this spool has been set in place, the strip is drawn along the table and its end connected with the spool 63. Between the table and the spool 63, the record tape or strip passes across a driving roller 64 carried by a shaft 65 which extends longitudinally of the housing at one side thereof and has its front end rotatably mounted in the upper portion of a gear housing 66. The gear housing extends vertically and encloses a train of reducing gearing 67 by means of which rotary motion is transmitted at reduced speed from the shaft 4 to the shaft 65. It will thus be seen that the speed of the shaft 65 will be predetermined in relation to the speed of the shaft 4 and since the roller 64 is provided with teeth or sprockets 68 for engaging in lines of openings 69 along side edges of the record strip, the strip will be slowly shifted from the roller or spool 62 toward the roller 63 during operation of the scale. Friction pulleys 70 and 71 carried by the shaft 65 and the shaft of the roller or spool 63 have peripheral engagement with each other, as shown in Figs. 1 and 8, and it will be readily understood that as the record strip is drawn from the spool 62 by rotation of the roller, the spool 63 will be rotated to wind the strip thereon. The upper or outer surface of the record strip is marked transversely, as shown in Fig. 10, by lines 72 accompanied by hour markings 73 and, between these hour lines are other cross lines 74 indicating quarter hours. The speed at which the roller 64 turns in such that the record strip moves very slowly and an hour is required for the record strip to be marked from one line 72 to another. This record strip also bears columns of numbers which correspond to the numbers or dial markings 24 and these dial markings or numbers 75 appear along lines 76 which extend longitudinally of the record strip. The upper or outer surface of the record strip is coated with wax and when a scratch is made through this coating, the upper surface of the strip will be exposed to view. The strip is formed of colored material, such as red paper, and the wax is white or some other contrasting color. Therefore, when a scratch is made through the wax, a scoring line 77 will appear on the record strip, as shown in Fig. 2, and the attendant having charge of the scale may determine the amount of material, by weight, which has passed through the scale during the time the scale has been in operation, it being necessary to also know the speed at which the conveyor belt moves in order to do so.

The line 77 is formed through the wax coating by a marker 78 carried by a bar 79 extending longitudinally in the casing 20 and supported upon rollers 80. The point 81 of the marker rests on the record strip, as shown in Fig. 7, and it will be readily understood that, as the strip moves from one spool to the other, the point of the marker will cut through the wax coating of the record strip and a scoring line formed along the strip. The bar 79 is toothed for a portion of its length to form a rack 82 and, since one of the rollers 80 is loosely mounted on the shaft 33, the rack will be held in mesh with a gear 83 fixed to the shaft 31. When the shaft 31 is rotated by movement of the lever 41, in response to vertical movement of the scale platform, and rotary motion is transmitted to the shaft 26 to swing the pointer 25 about the circular dial 23, turning of the gear 83 with the shaft 31 will shift the bar 79 longitudinally and the marker 78 will be shifted transversely of the record strip and the line 77 will be formed along the record strip in cooperating relation to a column of dial markings or figures 75 corresponding to the companion column of dial markings or figures 24 on the circular dial. It will thus be seen that the weight of material passing through the scale and shown upon the circular dial will be accurately marked upon the record strip and, upon inspecting the record strip, it can be determined just how much material has passed through the scale during the entire length of time the scale has been in operation.

Having thus described the invention, what is claimed is:

1. In a scale for weighing a moving stream of material, a main casing having an inlet and an outlet, a weighing platform in the casing, a conveyor for moving material along the platform between the inlet and the outlet, the conveyor having a rotary drive shaft, a housing supported on said casing, a dial casing supported by said housing, a dial in the dial casing, a pointer for cooperating with said dial, a shaft carrying said pointer rotatably mounted and extending into the housing, and means actuated from the weighing platform for rotating the pointer shaft including a lever pivotally mounted in the housing and geared to the pointer shaft.

2. In a scale for weighing a moving stream of material, a main casing having an inlet and an outlet, a weighing platform in the casing, a conveyor for moving material along the platform between the inlet and the outlet, the conveyor having a rotary drive shaft, a housing supported on said casing, a dial casing supported by said housing, a dial in the dial casing, a pointer for cooperating with said dial, a shaft carrying said pointer rotatably mounted and extending into the housing, a shaft rotatably mounted transversely in the housing and geared to the pointer shaft, a pinion carried by the transverse shaft, a lever pivotally mounted in the housing and having rack teeth meshing with the pinion, means actuated from the weighing platform for tilting the lever and effecting adjustment of the pointer in response to variations in the weight of material passing through the main casing.

3. In a scale for weighing a moving stream of material, a casing having an inlet and an outlet, a weighing platform in the casing, a conveyor for moving material along the platform between the inlet and the outlet, the conveyor having a rotary drive shaft, a housing supported on said casing, a dial casing supported by said housing, a dial in the dial casing, a pointer for cooperating with said dial, a shaft carrying said pointer rotatably mounted and extending into the housing, a shaft rotatably mounted transversely in the housing and geared to the pointer shaft, a pinion carried by the transverse shaft, a balance shaft rotatably mounted in the housing, weights carried by the balance shaft, a lever carried by said balance shaft, an arcuate rack carried by said lever and meshing with said pinion for imparting rotation to the pointer shaft, and means actuated from the weighing platform for tilting the lever in response to variations in the weight of material upon the conveyor.

4. In a scale for weighing a moving stream of material, a main casing having an inlet and an outlet, a weighing platform in the casing, a conveyor for moving material along the platform between the inlet and the outlet, the conveyor having a rotary drive shaft, a housing supported upon said casing, a shaft rotatably mounted transversely in the housing, a pinion carried by the transverse shaft, a lever pivotally mounted in the housing and having a rack meshing with the pinion, means actuated from the weighing platform for tilting the lever, a table extending transversely in the housing under a sight opening in the top of said housing, spools rotatably mounted at opposite ends of the table, a record strip extending across the table from one spool to the other, a shaft rotatably mounted and extending longitudinally of the main casing, a feed roller for the record strip carried by the last mentioned shaft, means for transmitting rotary motion from the drive shaft of the conveyor to the roller shaft, means for transmitting rotary motion from the roller shaft to the adjacent spool, and means actuated from the pinion carrying shaft for forming a line upon the record strip as it moves from one spool to the other.

5. In a scale for weighing a moving stream of material, a main casing having an inlet and an outlet, a weighing platform in the casing, a conveyor for moving material along the platform between the inlet and the outlet, the conveyor having a rotary drive shaft, a housing supported on said casing, a shaft rotatably mounted transversely in the housing, a pinion carried by the transverse shaft, a lever pivotally mounted in the housing and having a rack meshing with the pinion, means actuated from the weighing platform for tilting the lever and effecting adjustment of the pinion carrying shaft in response to variations in the weight of material passing through the casing, a table extending transversely in the housing under a sight opening in the top of said housing, spools rotatably mounted at opposite ends of the table, a record strip extending across the table from one spool to the other, a shaft rotatably mounted and extending longitudinally of the main casing, a feed roller for the record strip carried by the last mentioned shaft, means for transmitting rotary motion from the drive shaft of the conveyor to the roller shaft, means for transmitting rotary motion from the roller shaft to the adjacent spool, a bar extending longitudinally in said housing and across the table, shafts rotatably mounted in said housing, rollers carried by the last mentioned shafts and supporting the bar for shifting longitudinally of the housing, a gear carried by the pinion carrying shaft, said bar being provided with a rack meshing with the gear for effecting longitudinal shifting of the bar as the pinion carrying shaft rotates in response to variations in weight of material upon the conveyor, and a marker carried by said bar over the table for resting on the record strip and forming a line thereon as the record stip is moved longitudinally during operation of the scale.

GLEN G. MERCHEN.